March 13, 1956 R. H. WILSON 2,737,829
DIFFERENTIAL AND REDUCTION GEAR MEANS FOR ROAD VEHICLE AXLES
Filed Feb. 4, 1954
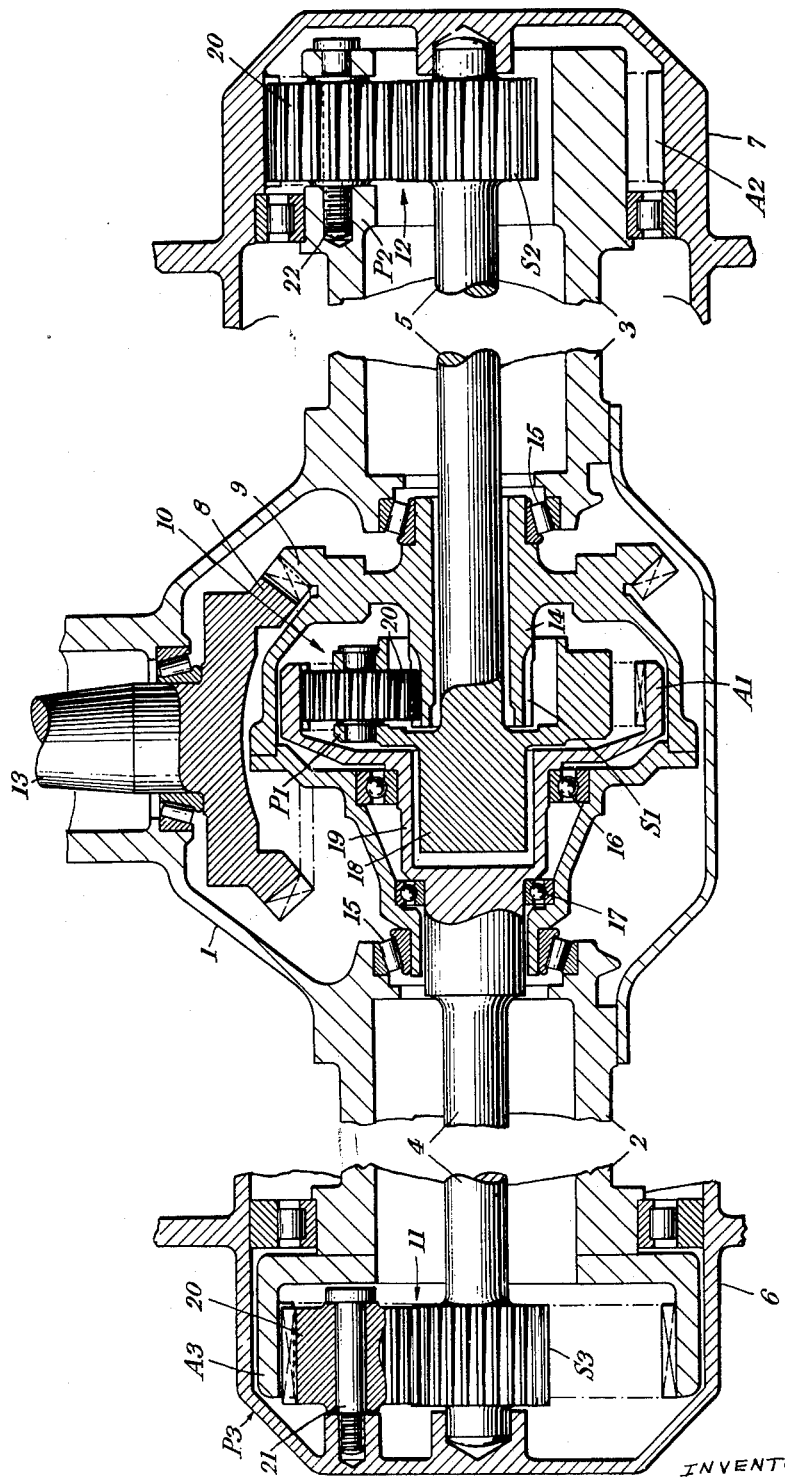
INVENTOR
Ronald H. Wilson
By Watson, Cole, Grindle & Watson
ATTORNEYS

United States Patent Office 2,737,829
Patented Mar. 13, 1956

2,737,829

DIFFERENTIAL AND REDUCTION GEAR MEANS FOR ROAD VEHICLE AXLES

Ronald H. Wilson, Horsforth, near Leeds, England, assignor to Kirkstall Forge Engineering Limited, Leeds, England Application February 4, 1954, Serial No. 408,153

Claims priority, application Great Britain February 17, 1953

6 Claims. (Cl. 74—694)

This invention relates to driven axles for motor road vehicles of the type, described in U. S. Patent No. 2,648,236, comprising an axle casing, a pair of live axles each driving one of the road wheels, and a reduction gearing constituted by gear trains which drive the road wheels at substantially equal torque while allowing differential movement thereof.

The axle described in U. S. Patent No. 2,648,236 includes a first reduction stage in the axle casing, the second reduction stage consisting of a pair of gear trains, also in the axle casing, and each comprising three components, viz. a gear wheel, an internally toothed annulus and a pinion carrier, one component of the first gear train being driven from the first reduction stage, another component thereof driving one of the live axles and the third component thereof driving the gear wheel of the second gear train, and a second component of the second gear train being fixed, or adapted to be fixed, to the axle casing, and the third component thereof driving the other live axle.

There are, however, limits to the overall reduction which is obtainable with the axle described in U. S. Patent No. 2,648,236, and the present invention aims to provide an axle which, whether or not it includes a first reduction stage, will give a much larger overall reduction.

The invention provides a driven axle for a motor road vehicle of the above type, in which the reduction gearing comprises three gear trains, each constituted by an internally toothed annulus, a pinion carrier and a center gear wheel, namely an inner epicyclic gear train in the axle casing, the center gear wheel of which is adapted to be driven from the transmission of the vehicle, and a pair of outer gear trains of similar tooth ratio, the center gear wheel of one outer gear train being coupled for rotation with the annulus of the inner epicyclic gear train, its annulus being fixed and its pinion carrier driving one road wheel and the center gear wheel of the other outer gear train being coupled for rotation with the pinion carrier of the inner epicyclic gear train, its pinion carrier being fixed and its annulus driving the other road wheel.

Preferably the axle includes a bevel drive as a first reduction stage, but, in appropriate cases, a worm or other suitable drive may be used as an alternative. As noted, however, a first reduction stage is not essential and the center gear wheel of the inner epicyclic gear train may be driven from the transmission shaft of the vehicle through gearing having a 1:1 ratio. The outer gear trains may be disposed in the wheel hubs but, as an alternative, they may be disposed in the axle casing and drive their associated road wheels through live axles extending from the axle casing to the road wheels.

One specific embodiment of the invention, as applied to the driven rear axle of a motor road vehicle, will now be described in more detail by way of example, with reference to the accompanying drawing. It will be appreciated, however, that the invention is also applicable to driven front axles and to steering and driven axles since, in the latter case, universal joints may be incorporated in the live axles.

The rear axle shown in the drawing, which is a diagrammatic plan view, partly in section, comprises an axle casing 1 from which project the usual axle arms 2, 3 containing the live axles 4, 5 for transmitting the drive from the axle casing to the road wheels, the hubs of which are shown at 6 and 7. In the axle casing is a first reduction stage, driven from the transmission shaft 13 and constituted by bevel gears 8, 9 giving a reduction of 1.25/1, and an inner epicyclic gear train 10. Two outer gear trains 11, 12 are provided, one in each wheel hub, the gear train 11 being an epicyclic gear train and the gear train 12 a reduction train. The center gear wheels of the gear trains 10, 11, 12 are identified by the references $S_1$, $S_2$, $S_3$ respectively, the pinion carriers by $P_1$, $P_2$, $P_3$ and the annuli by $A_1$, $A_2$, $A_3$.

All of the three gear trains are 3 to 1 trains, i. e. $A/S=3$ where A is the number of teeth on the annulus and S the number of teeth on the center gear wheel. Conveniently the annulus of each gear train has 72 teeth and its center gear wheel 24 teeth, and its pinion carrier carries three pinions 20, each having 24 teeth.

The driven bevel gear 9 of the first reduction stage is formed on, or may be bolted to, a sleeve 14 carrying the sun wheel $S_1$ of the central epicyclic gear train 10 and supported on bearings 15. The pinion carrier $P_1$ of the central epicyclic gear train has an offset extension, shown diagrammatically at 18, and attached, e. g. by splines, to the offside live axle 5, which extends through the sleeve 14 and carries the center gear wheel $S_2$ of the offside hub reduction gear train. The annulus $A_1$ of the inner epicyclic gear train has an offset extension 19 supported by bearings 16 and 17 and attached, i. e. by splines, to the near side live axle 4, which carries the center gear wheel $S_3$ of the near side hub reduction gear train.

In a simple epicyclic train the sun wheel torque plus the annulus torque is always equal to the pinion carrier torque. If therefore unit torque is applied in a clockwise direction to the driven bevel gear 9 of the first reduction stage, the near side live axle 4 (coupled to the annulus $A_1$ of the inner train) will experience a torque of 3 in a counter-clockwise direction and the offside live axle 5 (coupled to the pinion carrier $P_1$ of the inner train) a torque of 4 in a clockwise direction.

The pinions 20 of the near side hub reduction gear train are mounted on bolts 21 fixed to the near side wheel hub 6, which thus constitutes the pinion carrier $P_3$ of the near side train 12, and its annulus $A_3$ is fixed to the axle arm 2. The near side road wheel accordingly experiences a torque of 12 in a counter-clockwise direction. The pinions 20 of the offside hub reduction gear train are mounted on bolts 22 fixed to the axle arm 3, which thus constitutes the pinion carrier $P_2$ of the near side train 11, so that this gear train functions as a straight reduction gear, and its annulus $A_2$ is integral with the offside wheel hub 7. The offside road wheel therefore also experiences a torque of 12 in a counter-clockwise direction.

The total output torque is thus 24 so that the second stage reduction is 24:1. As the bevel gearing gives a reduction of 1.25:1 the overall reduction is 30:1.

The arrangement described thus gives the large reduction required without occupying undue space. The symmetrical position of the input shaft 13 is an advantage and the three gear trains are all readily removable for servicing.

What I claim as my invention and desire to secure by Letters Patent is:

1. In a driven axle for a motor road vehicle including an axle casing and a pair of wheel hubs, reduction gearing for driving said wheel hubs from a transmission shaft at substantially equal torque while permitting of differential movement thereof, comprising an inner epicyclic gear train in the axle casing and two outer gear trains one of which is an epicyclic gear train and the other of which is a reduction gear train, each of said three gear trains including a center gear wheel, an internally toothed annulus, a pinion carrier and pinions on said carrier meshing with said center gear wheel and with said annulus, the center gear wheel of said inner epicyclic gear train being adapted to be driven from said transmission shaft, the annulus of the outer epicyclic gear train and the pinion carrier of the outer reduction gear train being held fixed, the pinion carrier of the outer epicyclic gear train driving one wheel hub and the annulus of the outer reduction gear train driving the other wheel hub, means coupling the center gear wheel of said outer epicyclic gear train for rotation with the annulus of the inner epicyclic gear train, and means coupling the center gear wheel of the said outer reduction gear train for rotation with the pinion carrier of the inner epicyclic gear train.

2. In a driven axle for a motor road vehicle including an axle casing and a pair of wheel hubs, reduction gearing for driving said wheel hubs from a transmission shaft at substantially equal torque while permitting of differential movement thereof, including a first reduction stage in the axle casing and a second reduction stage, said second reduction stage comprising an inner epicyclic gear train in the axle casing and two outer gear trains one of which is an epicyclic gear train and the other of which is a reduction gear train, each of said three gear trains including a center gear wheel, an internally toothed annulus, a pinion carrier and pinions on said carrier meshing with said center gear wheel and with said annulus, the center gear wheel of said inner epicyclic gear train being adapted to be driven from said transmission shaft, through said first reduction stage, the annulus of the outer epicyclic gear train and the pinion carrier of the outer reduction gear train being held fixed, the pinion carrier of the outer epicyclic gear train driving one wheel hub and the annulus of the outer reduction gear train driving the other wheel hub, means coupling the center gear wheel of said outer epicyclic gear train for rotation with the annulus of the inner epicyclic gear train, and means coupling the center gear wheel of the said outer reduction gear train for rotation with the pinion carrier of the inner epicyclic gear train.

3. In a driven axle for a motor road vehicle including an axle casing and a pair of wheel hubs, reduction gearing for driving said wheel hubs from a transmission shaft at substantially equal torque while permitting of differential movement thereof, including a first reduction stage in the axle casing constituted by bevel gearing and a second reduction stage, said second reduction stage comprising an inner epicyclic gear train in the axle casing and two outer gear trains one of which is an epicyclic gear train and the other of which is a reduction gear train, each of said three gear trains including a center gear wheel, an internally toothed annulus, a pinion carrier and pinions on said carrier meshing with said center gear wheel and with said annulus, the center gear wheel of said inner epicyclic gear train being adapted to be driven from said transmission shaft through said first reduction stage, the annulus of the outer epicyclic gear train and the pinion carrier of the outer reduction gear train being held fixed, the pinion carrier of the outer epicyclic gear train driving one wheel hub and the annulus of the outer reduction gear train driving the other wheel hub, means coupling the center gear wheel of said outer epicyclic gear train for rotation with the annulus of the inner epicyclic gear train, and means coupling the center gear wheel of said outer reduction gear train for rotation with the pinion carrier of the inner epicyclic gear train.

4. In a driven axle for a motor road vehicle comprising an axle casing, a pair of wheel hubs and first and second live axles, reduction gearing for driving said wheel hubs from a transmission shaft at substantially equal torque while permitting of differential movement thereof, and including an inner epicyclic gear train in the axle casing, said inner epicyclic train having a center gear wheel driven from said transmission shaft, a pinion carrier fixed to the first live axle and an annulus fixed to the second live axle, and two gear trains, each disposed within one of the wheel hubs and each including a center gear wheel fixed to one of the live axles, a pinion carrier, pinions on the pinion carrier meshing with the center wheel and an internally toothed annulus meshing with said pinions, the outer gear train driven by said first live axle having its pinion carrier fixed and its annulus driving the associated wheel hub, and the other outer gear train having its annulus fixed and its planet carrier driving the associated wheel hub.

5. In a driven axle for a motor road vehicle comprising an axle casing, a pair of wheel hubs and first and second live axles, reduction gearing for driving said wheel hubs from a transmission shaft at substantially equal torque while permitting of differential movement thereof, and comprising a first reduction stage in the axle casing and a second reduction stage including an inner epicyclic gear train in the axle casing, said inner epicyclic train having a center gear wheel driven from said transmission shaft through said first reduction stage, a pinion carrier fixed to the first live axle and an annulus fixed to the second live axle, and two gear trains, each disposed within one of the wheel hubs and each including a center gear wheel fixed to one of the live axles, a pinion carrier, pinions on the pinion carrier meshing with the center wheel and an internally toothed annulus meshing with said pinions, the outer gear train driven by said first live axle having its pinion carrier fixed and its annulus driving the associated wheel hub, and the other outer gear train having its annulus fixed and its planet carrier driving the associated wheel hub.

6. In a driven axle for a motor road vehicle comprising an axle casing, a pair of wheel hubs and first and second live axles, reduction gearing for driving said wheel hubs from a transmission shaft at substantially equal torque while permitting of differential movement thereof, as claimed in claim 5, wherein said first reduction stage is constituted by bevel gearing.

References Cited in the file of this patent

UNITED STATES PATENTS

| | | |
|---|---|---|
| 876,501 | Steinhauer | Jan. 14, 1908 |
| 1,264,748 | Apple | Apr. 30, 1918 |
| 1,327,206 | Jackson | Jan. 6, 1920 |
| 1,467,939 | Knap | Sept. 11, 1923 |
| 1,585,141 | Foote | May 18, 1926 |
| 2,648,236 | Wilson | Aug. 11, 1953 |

FOREIGN PATENTS

| | | |
|---|---|---|
| 657,264 | Great Britain | Sept. 12, 1951 |